(12) United States Patent
Yamanaka et al.

(10) Patent No.: US 9,525,321 B2
(45) Date of Patent: Dec. 20, 2016

(54) ROTATION DRIVING DEVICE

(71) Applicant: DENSO CORPORATION, Kariya, Aichi-pref. (JP)

(72) Inventors: Tetsuji Yamanaka, Obu (JP); Osamu Sato, Takahama (JP); Naoaki Kouno, Chiryu (JP)

(73) Assignee: DENSO CORPORATION, Kariya (JP)

( * ) Notice: Subject to any disclaimer, the term of this patent is extended or adjusted under 35 U.S.C. 154(b) by 71 days.

(21) Appl. No.: 14/142,133

(22) Filed: Dec. 27, 2013

(65) Prior Publication Data

US 2014/0187373 A1    Jul. 3, 2014

(30) Foreign Application Priority Data

Dec. 27, 2012  (JP) ................................ 2012-286099

(51) Int. Cl.
| | | |
|---|---|---|
| *F16H 1/32* | (2006.01) | |
| *H02K 11/00* | (2016.01) | |
| *H02K 7/116* | (2006.01) | |

(52) U.S. Cl.
CPC ............. *H02K 7/116* (2013.01); *H02K 11/215* (2016.01); *F16H 1/32* (2013.01)

(58) Field of Classification Search
CPC ....... F16H 1/32; F16H 1/321; F16H 2001/323
USPC ................................. 475/162, 163
See application file for complete search history.

(56) References Cited

U.S. PATENT DOCUMENTS

| | | | | |
|---|---|---|---|---|
| 3,037,400 | A | * | 6/1962 | Sundt ........................ F16H 1/32 475/176 |
| 3,429,393 | A | * | 2/1969 | Lorence ............... B62D 55/125 180/9.62 |
| 4,926,636 | A | * | 5/1990 | Tadokoro ................ F01N 1/003 123/357 |
| 5,672,135 | A | * | 9/1997 | Hamada .................. F16H 59/36 310/68 B |
| 2003/0022750 | A1 | * | 1/2003 | Rilbe ...................... F16H 1/321 475/163 |
| 2005/0199201 | A1 | | 9/2005 | Schafer et al. |
| 2006/0070604 | A1 | | 4/2006 | Sasaki |
| 2009/0017953 | A1 | | 1/2009 | Uehara et al. |
| 2009/0235766 | A1 | | 9/2009 | Keefover et al. |
| 2010/0319663 | A1 | | 12/2010 | Gracner et al. |

(Continued)

FOREIGN PATENT DOCUMENTS

| | | |
|---|---|---|
| CN | 202144896 | 2/2012 |
| JP | 09-177905 | 7/1997 |
| JP | 2007-187540 | 7/2007 |

*Primary Examiner* — Jacob S Scott
*Assistant Examiner* — Tinh Dang
(74) *Attorney, Agent, or Firm* — Nixon & Vanderhye P.C.

(57) ABSTRACT

A rotation driving device includes a motor provided in a housing, a planetary gear reducer connected to the motor coaxially with the motor, an output shaft connected to an end reduction member of the planetary gear reducer coaxially with the end reduction member, and a rotation detector located at the same position as the end reduction member in an axial direction of the planetary gear reducer and located at a different position from a center axis of the end reduction member in a radial direction of the planetary gear reducer, the rotation detector being capable of detecting a degree of rotation of the end reduction member. Accordingly, the rotation driving device can be made to be smaller and compact in the axial direction.

13 Claims, 12 Drawing Sheets

(56) References Cited

U.S. PATENT DOCUMENTS

2012/0001104 A1     1/2012   Shimada et al.
2012/0001111 A1     1/2012   Takeda et al.
2012/0330490 A1*   12/2012   Ozaki .................. G01D 5/2451
                                                         701/22

* cited by examiner

ROTATION DRIVING DEVICE

CROSS REFERENCE TO RELATED APPLICATION

This application is based on and incorporates herein by reference Japanese Patent Application No. 2012-286099 filed on Dec. 27, 2012.

TECHNICAL FIELD

The present disclosure relates to a rotation driving device.

BACKGROUND

A rotation driving device is known, in which a motor, a reduction drive and an output shaft are provided coaxially. For example, a rotation driving device disclosed in Patent Document 1 (JP 09-177905 A) includes a rotation detector coaxial with a motor on an opposite side of the motor from a reduction drive. The above-described rotation driving device is connected to an output shaft and is capable of detecting rotation of a detection shaft inserted into a hollow-cylindrical motor shaft.

In the rotation driving device of Patent Document 1, a space for the rotation detector is provided in addition to spaces for the motor, the reduction drive and the output shaft. Therefore, a size of the rotation driving device in its axial direction may become large.

SUMMARY

It is an objective of the present disclosure to provide a rotation driving device having a body size relatively small in its axial direction.

According to an aspect of the present disclosure, a rotation driving device includes a housing, a motor, a planetary gear reducer, an output shaft and a rotation detector. The motor is provided in the housing, and the planetary gear reducer is connected to the motor. The planetary gear reducer is coaxial with the motor. The output shaft is connected to an end reduction member of the planetary gear reducer, and the output shaft is coaxial with the end reduction member. The rotation detector is located at the same position as the end reduction member in an axial direction of the planetary gear reducer and is located at a different position from a center axis of the end reduction member in a radial direction of the planetary gear reducer. The rotation detector is capable of detecting a degree of rotation of the end reduction member.

Therefore, in the present disclosure, the rotation detector can be provided in the axial direction in a space that is for the planetary gear reducer. Accordingly, a body size of the rotation driving device in the axial direction can be made to be smaller and compact as compared with an example in which a space for the rotation detector in the axial direction is necessary in addition to spaces for the motor, reducer and output shaft.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
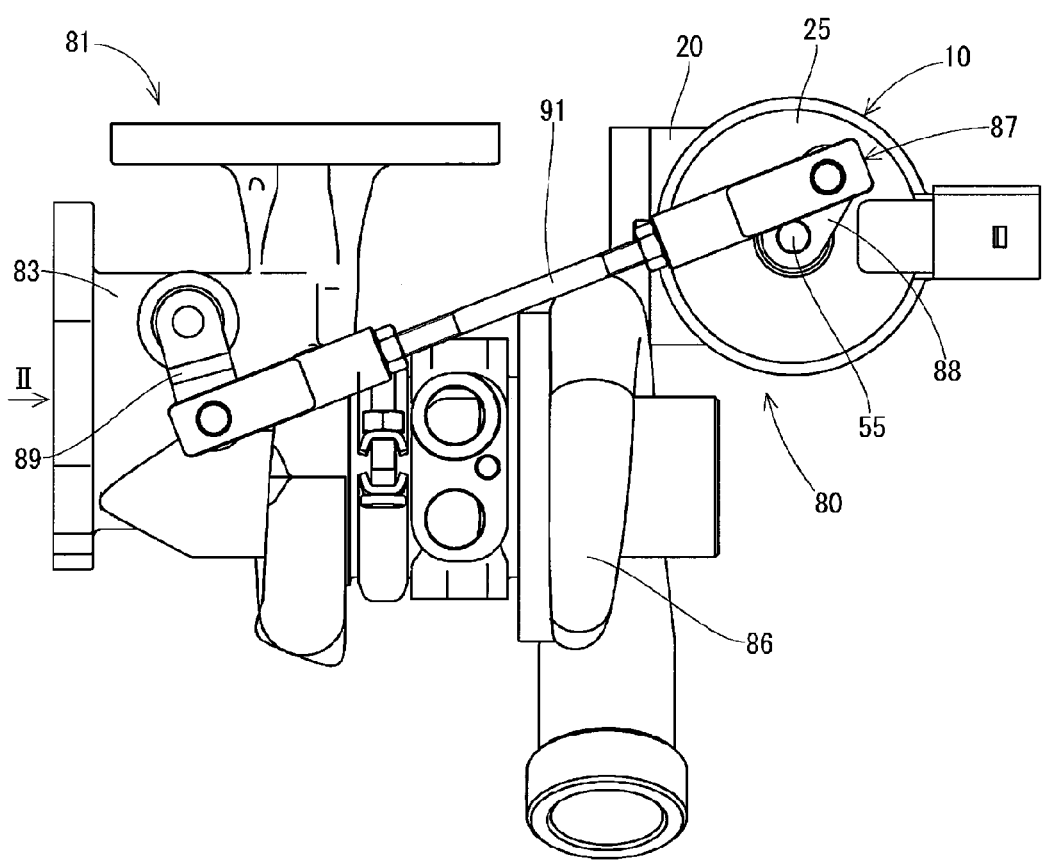
FIG. 1 is a view showing a wastegate valve device provided with a rotation driving device according to a first embodiment of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
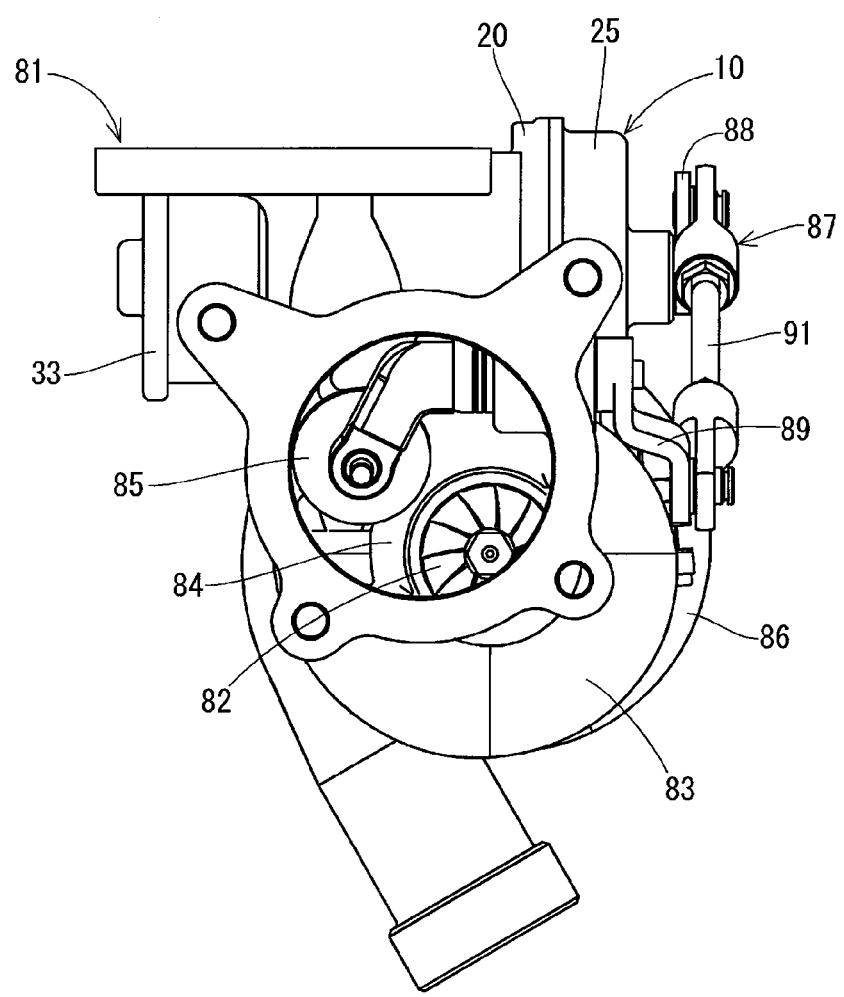
FIG. 2 is a view showing the wastegate valve device when the wastegate valve device is viewed from an arrow II of FIG. 1.
Figure 3:
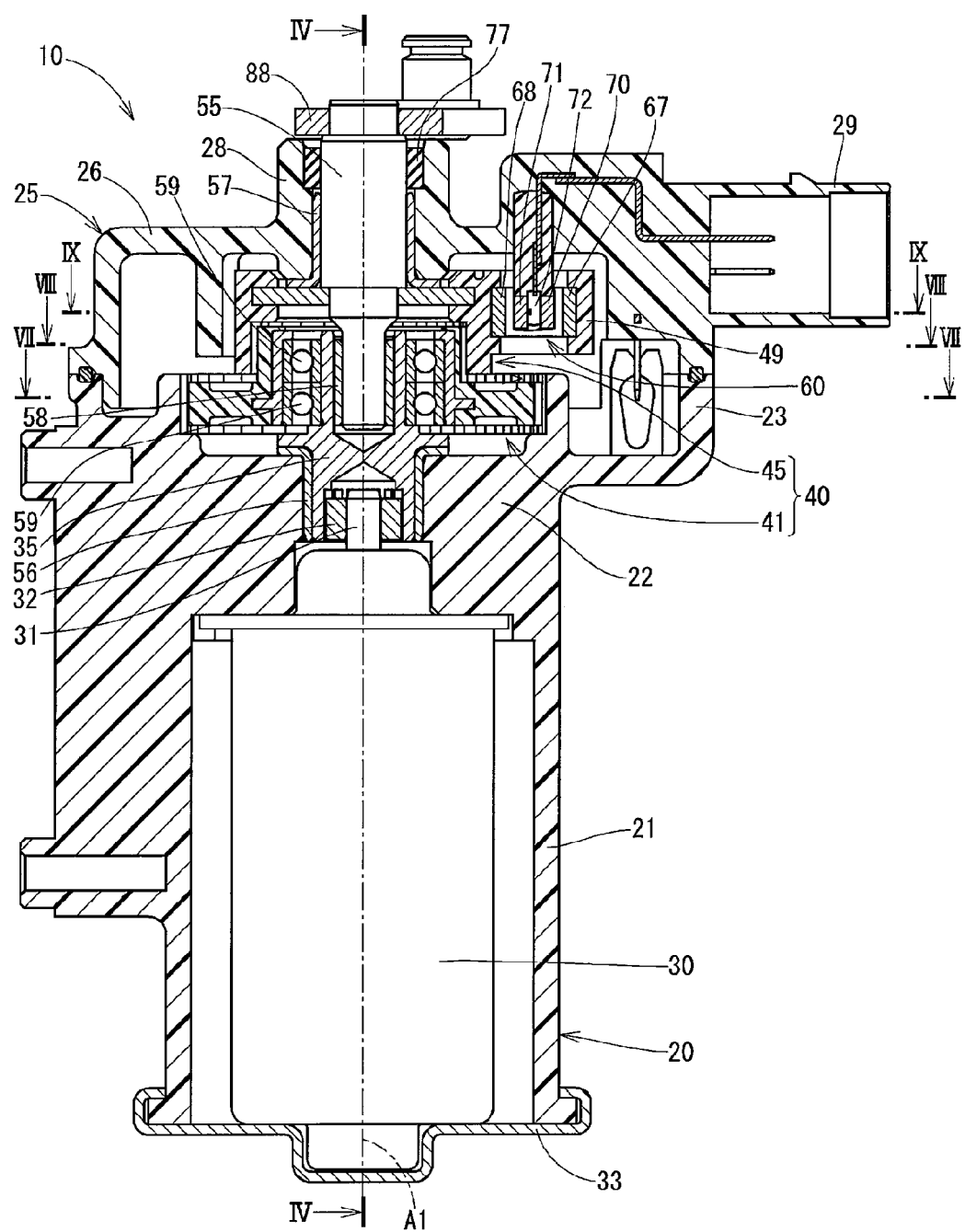
FIG. 3 is a sectional view showing the rotation driving device according to the first embodiment when an end reduction member is located at a center within its movable range.
Figure 4:
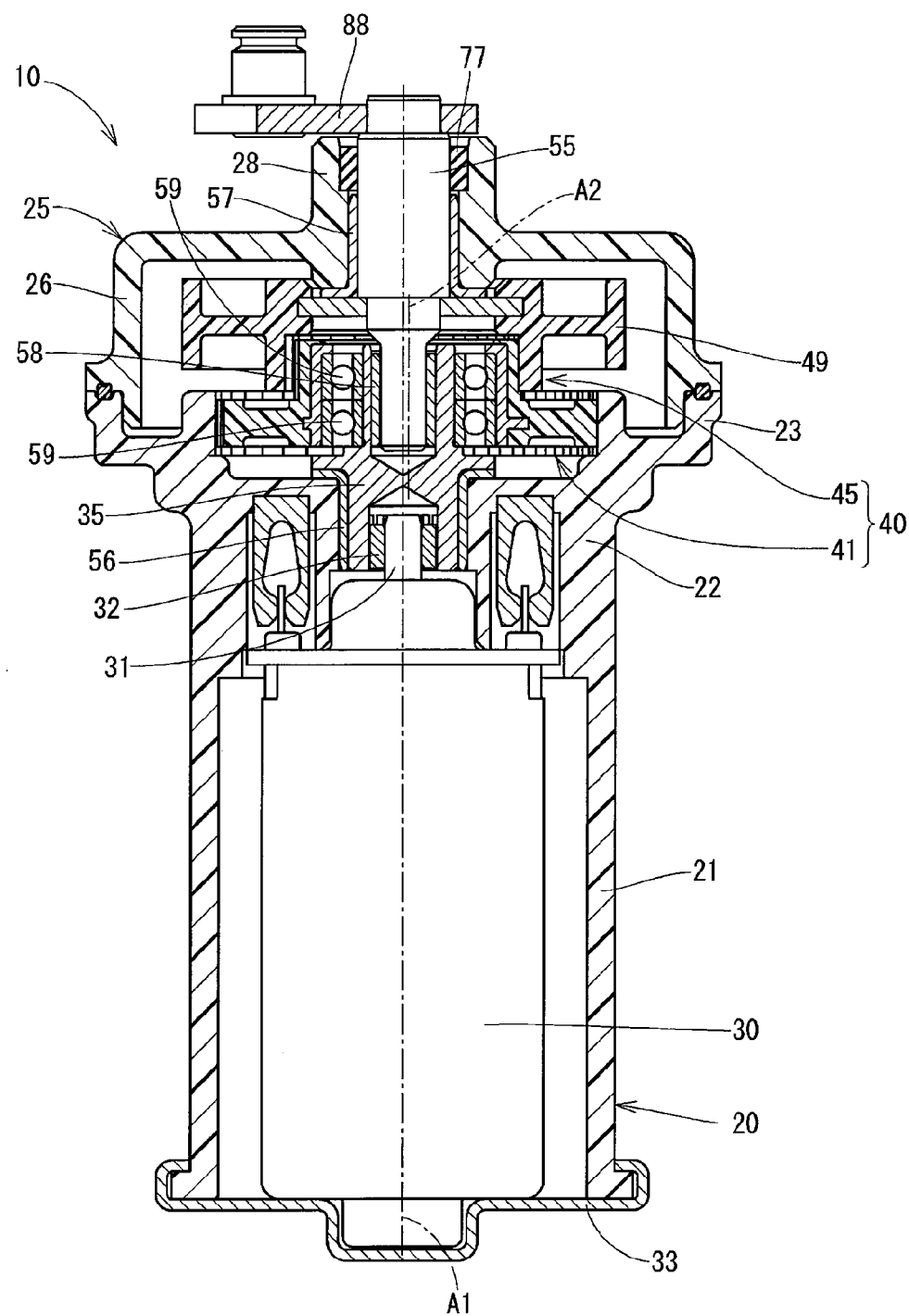
FIG. 4 is a sectional view taken along a line IV-IV of FIG. 3.

A rotation driving device 10 according to a first embodiment of the present disclosure is used for a wastegate valve device 80, as shown in FIGS. 1 and 2. The wastegate valve device 80 is provided in an engine supercharged by using a turbocharger 81. The wastegate valve device 80 causes a part of exhaust gas to flow separately, and adjusts a flow rate of exhaust gas introduced into a turbine 82. In accordance with the adjustment of the flow rate of exhaust gas into the turbine 82, a rotation rate of the turbocharger 81 can be controlled. Accordingly, a stable supercharging pressure can be obtained.

A configuration of the wastegate valve device 80 will be described with reference to FIGS. 1 and 2. The wastegate valve device 80 of the present embodiment includes a wastegate valve 85 provided in a turbine housing 83, the rotation driving device 10 fixed to an outer wall of a compressor housing 86, and a link mechanism 87 connecting an output shaft 55 of the rotation driving device 10 to the wastegate valve 85. As shown in FIG. 2, a part of the turbine housing 83 is used as a partition wall 84 which separates an exhaust-gas inlet from an exhaust-gas outlet of the turbocharger 81. The wastegate valve 85 is capable of opening or closing a bypass hole of the partition wall 84.

The link mechanism 87 includes a first lever 88 connected to the output shaft 55, a second lever 89 connected to a rotary shaft of the wastegate valve 85, and a rod 91 connecting the first lever 88 and the second lever 89. The link mechanism 87 is a four-bar link mechanism, in which a degree of freedom is 1. The link mechanism 87 converts motion of the first lever 81 to motion of the second lever 82. The link mechanism 87 reduces a speed of rotation of the output shaft 55 and transmits the rotation to the rotary shaft of the wastegate valve 85. A ratio between a length of the first lever 88 and a length of the second lever 89 is predetermined such that a total reduction ratio of the wastegate valve device 80 becomes a predetermined value. The total reduction ratio of the wastegate valve device 80 is obtained by multiplication of a reduction ratio of the link mechanism 87 and a reduction ratio of a planetary gear reducer 40 of the rotation driving device 10.

The rotation driving device 10 will be described with reference to FIGS. 3 to 10. The rotation driving device 10 includes a housing 20, a casing 25, a motor 30, a connection shaft 35, the planetary gear reducer 40, the output shaft 55 and a rotation detector 60. The housing 20 is made of resin. The housing 20 includes a motor accommodation portion 21, a first bearing portion 22 and a first-stage accommodation portion 23. A first bearing 56 is provided in the first bearing portion 22. The front accommodation portion 23 accommodates therein a first reduction portion 41 that is a first stage of the planetary gear reducer 40.

The casing 25 is made of resin. The casing 25 includes a second-stage accommodation portion 26, a second bearing portion 28 and a connector portion 29. The second-stage accommodation portion 26 accommodates therein a second reduction portion 45 that is a second stage of the planetary gear reducer 40. A second bearing 57 and a sealing member 77 are provided in the second bearing portion 28. In the present embodiment, the first-stage accommodation portion 23 of the housing 20 and the second-stage accommodation portion 26 of the casing 25 are joined to each other by secondary welding. For example, the housing 20 and the casing 25 are made to be in contact with each other on their matching surfaces and are pressed against each other. Subsequently, an annular clearance defined by grooves 24 and 27 of the matching surfaces is filled with melted resin. The housing 20 and the casing 25 are joined by solidification of the resin filled in the annular clearance. The filled resin may be made of the same kind of material as that of the housing 20 or the casing 25.

Figure 5:
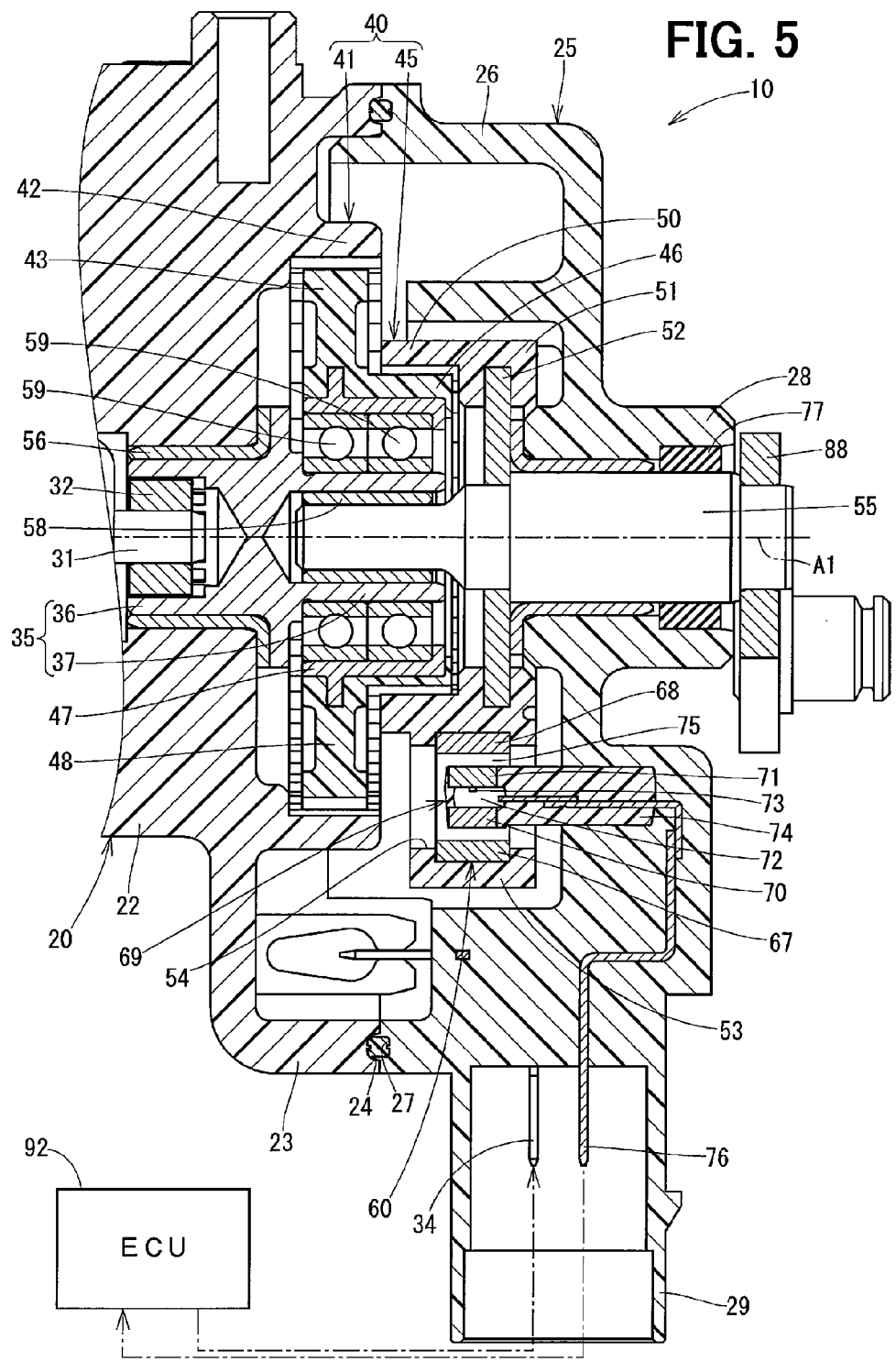
FIG. 5 is a sectional view showing a part of the rotation driving device of FIG. 3.

The motor 30 is accommodated in the motor accommodation portion 21 of the housing 20. An opening of the motor accommodation portion 21 is closed by a motor cover 33. A motor shaft 31 of the motor 30 protrudes into the first bearing portion 22 of the housing 20. In the present embodiment, the motor is a direct-current motor (DC motor), for example. The motor 30 is electrically connected to an electronic control unit 92 (ECU) via a power terminal 34, as shown in FIG. 5. When the electronic control unit 92 supplies a power to the motor 30, the motor shaft 31 is rotated.

Figure 6:
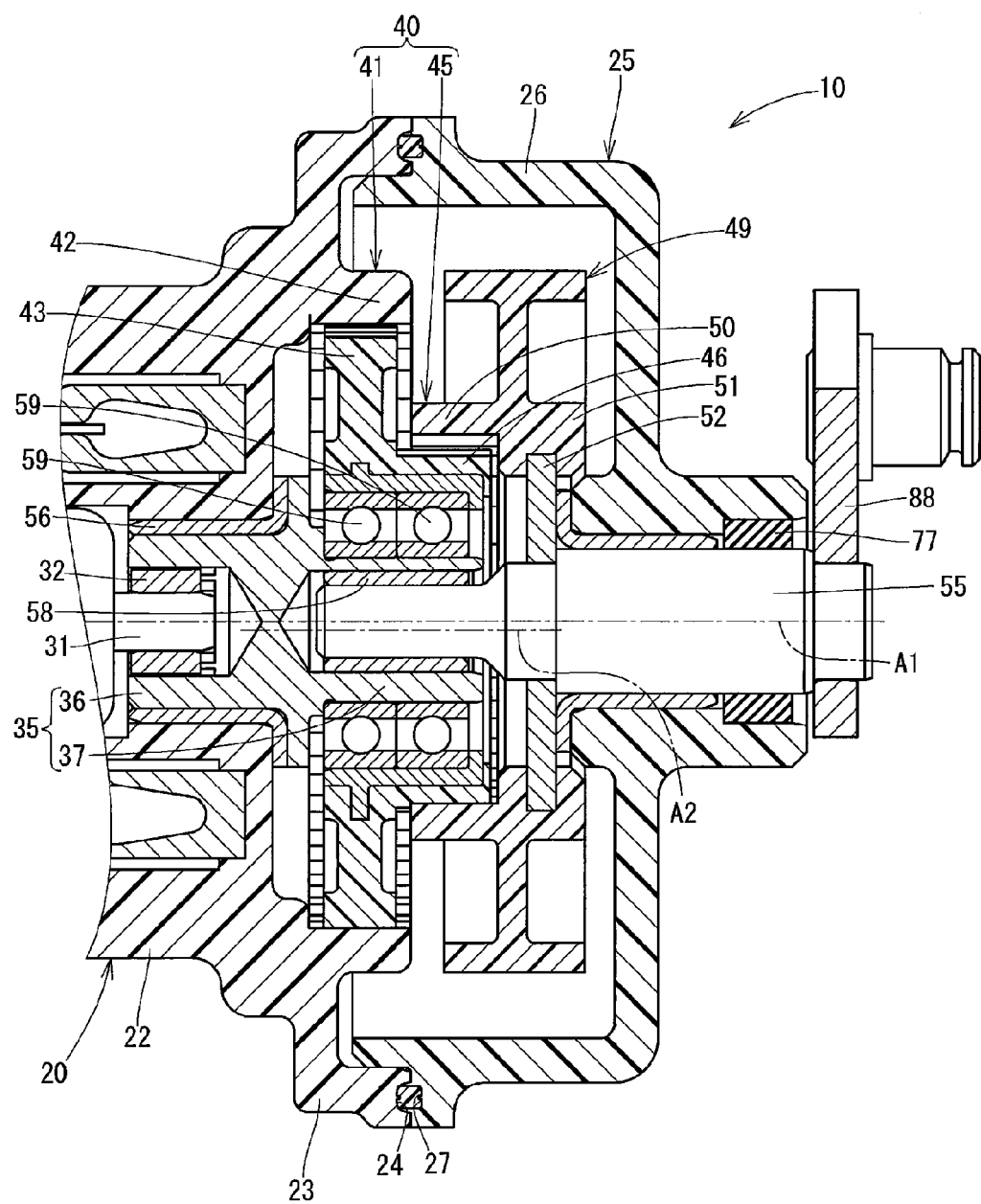
FIG. 6 is a sectional view showing a part of the rotation driving device of FIG. 4.

As shown in FIGS. 5 and 6, the connection shaft 35 includes a concentric portion 36 concentric with the motor shaft 31, and an eccentric portion 37 eccentric from the motor shaft 31. The concentric portion 36 is rotatably supported by the first bearing 56. The concentric portion 36 is splined to a pinion gear 32 fixed to the motor shaft 31. The concentric portion 36 is capable of transmitting rotation to the motor shaft 31 and is movable relatively to the motor shaft 31 in an axial direction of the motor shaft 31. The eccentric portion 37 is located on an opposite side of the concentric portion 36 from the motor 30, in other words, the concentric portion 36 is located between the motor 30 and the eccentric portion 37 in the axial direction. The eccentric portion 37 protrudes from the concentric portion 36 in the first-stage accommodation portion 23 of the housing 20 and extends in the axial direction into the second-stage accommodation portion 26 of the casing 25. The eccentric portion 37 has a cylindrical-hallow shape, and a third bearing 58 is provided inside the eccentric portion 37.

Figure 7:
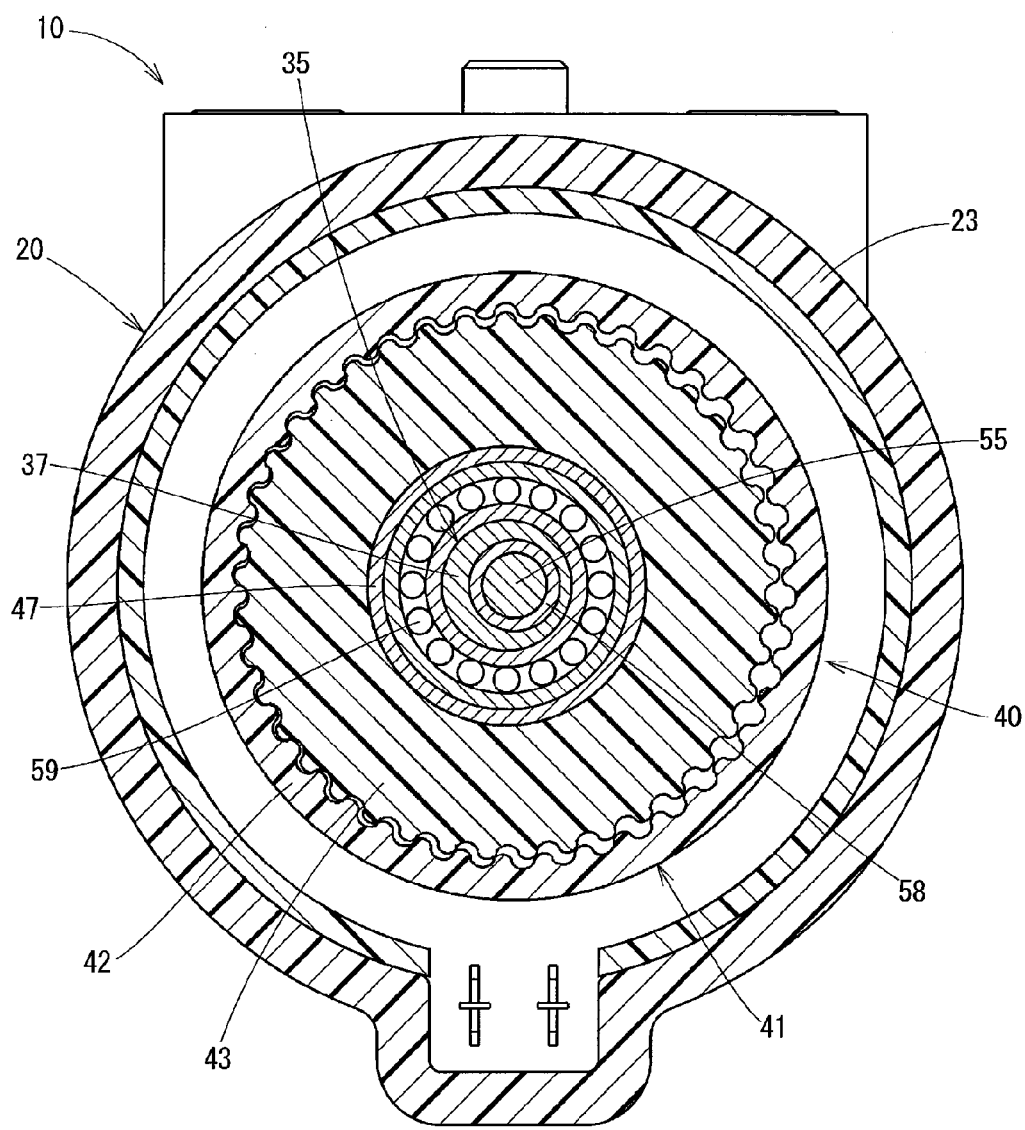
FIG. 7 is a sectional view taken along a line VII-VII of FIG. 3.

A hypocycloid gear mechanism, one of planetary gear mechanisms, is employed on the planetary gear reducer 40. In other words, the planetary gear reducer 40 is a hypocycloid gear reducer, and the planetary gear reducer 40 includes the first reduction portion 41 and the second reduction portion 45. As shown in FIGS. 5 to 7, the first reduction portion 41 includes a first internal gear 42 and a first planetary gear 43. The first internal gear 42 is concentric with the motor shaft 31 and is integrated with the first-stage accommodation portion 23 of the housing 20. In the present embodiment, the first internal gear 42 is made of resin, and may be made of the same material as the housing 20. In other words, the housing 20 and the first internal gear 42 may be molded at the same time.

The first planetary gear 43 is eccentric from the first internal gear 42 and is concentric with the eccentric portion 37 of the connection shaft 35. The first planetary gear 43 is rotatably supported by a fourth bearing 59 attached to the eccentric portion 37. The fourth bearing 59 includes two ball bearings arranged in the axial direction. The first planetary gear 43 is in contact with an inner side of the first internal gear 42. In the present embodiment, the number of teeth of the first internal gear 42 is 42, and the number of teeth of the first planetary gear 43 is 41. A difference in the number of teeth between the first internal gear 42 and the first planetary gear 43 is 1.

The second reduction portion 45 is provided on an opposite side of the first reduction portion 41 from the motor 30, in other words, the first reduction portion 41 is located between the motor 30 and the second reduction portion 45. The second reduction portion 45 includes a second planetary gear 46 and an end reduction member 49. The second planetary gear 46 is eccentric from the motor shaft 31 and is concentric with the first planetary gear 43. The second planetary gear 46 is smaller than the first planetary gear 43 in diameter. In the present embodiment, the first planetary gear 43 and the second planetary gear 46 are integrated with each other. The first planetary gear 43 and the second planetary gear 46 include a cylindrical member 47 and a gear portion 48. The cylindrical member 47 is made of metal and engages with an outer ring of the fourth bearing 59. The gear portion 48 is made of resin and is molded to be integrated with the cylindrical member 47. The gear portion 48 is made of a composite material containing fluorine resin, i.e. a fluorine-resin contained material.

Figure 8:
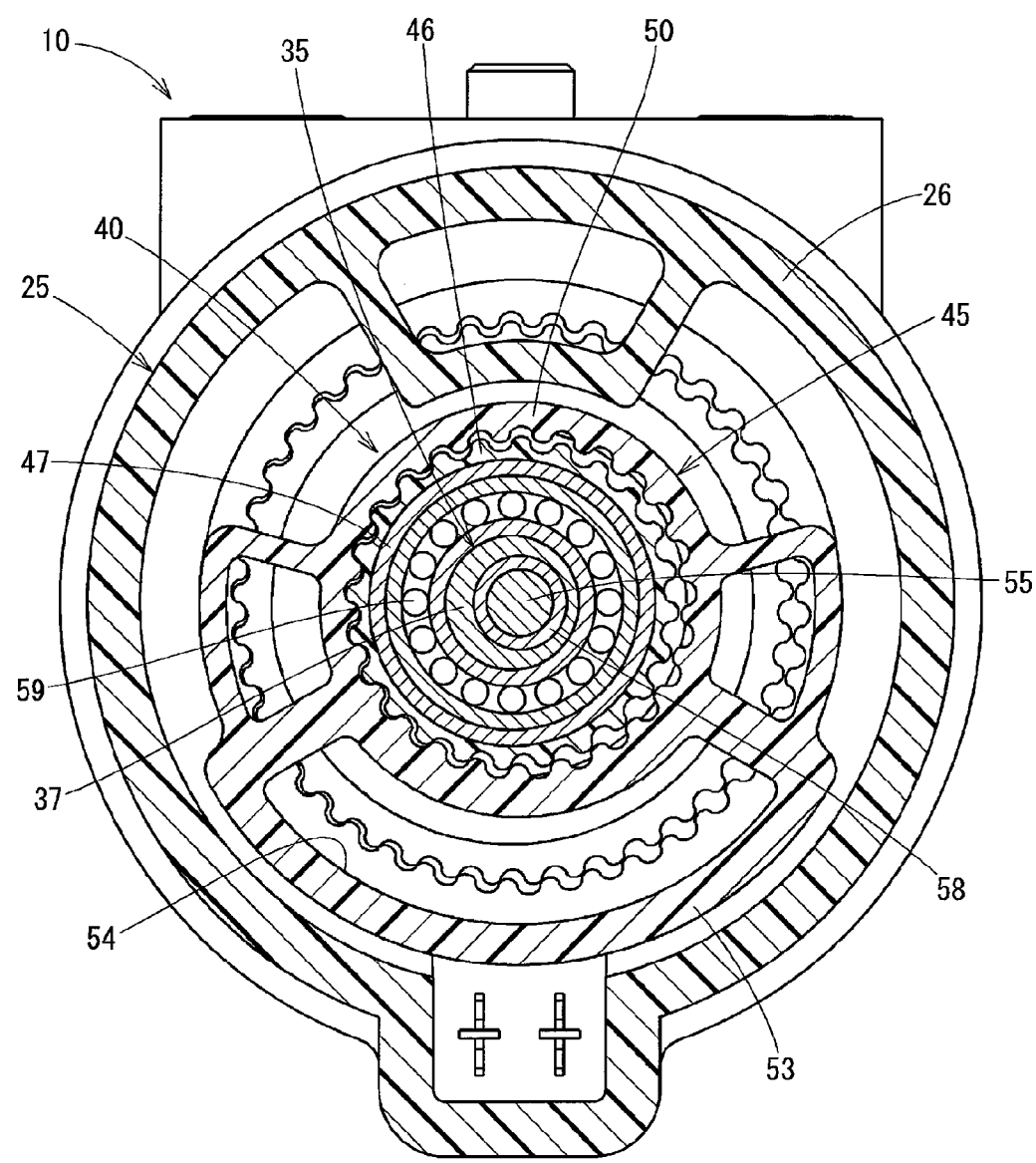
FIG. 8 is a sectional view taken along a line VIII-VIII of FIG. 3.

The end reduction member 49 is made of resin and is a rotary body eccentric from the second planetary gear 46 and concentric with the motor shaft 31. The end reduction member 49 includes a second internal gear 50. The second planetary gear 46 is in contact with an inner side of the second internal gear 50. The second internal gear 50 is smaller than the first planetary gear 43 in diameter. In the present embodiment, the number of teeth of the second planetary gear 46 is 24, and the number of teeth of the second internal gear 50 is 25. A difference of the number of teeth between the second planetary gear 46 and the second internal gear 50 is 1. The end reduction member 49 further includes an output-shaft connection portion 51 and a protrusion portion 53. The output-shaft connection portion 51 has an annular shape and extends from the second internal gear 50 toward an opposite side from the first planetary gear 43. The protrusion portion 53 protrudes from the second internal gear 50 and the output-shaft connection portion 51 outward in a radial direction of the second reduction portion 45. The output-shaft connection portion 51 is molded to be integrated with an annular member 52. The annular member 52 is made of metal and has a disc-like shape. As shown in FIG. 8, the protrusion portion 53 has a through hole 54 extending in a circumferential direction of the second reduction portion 45.

Figure 9:
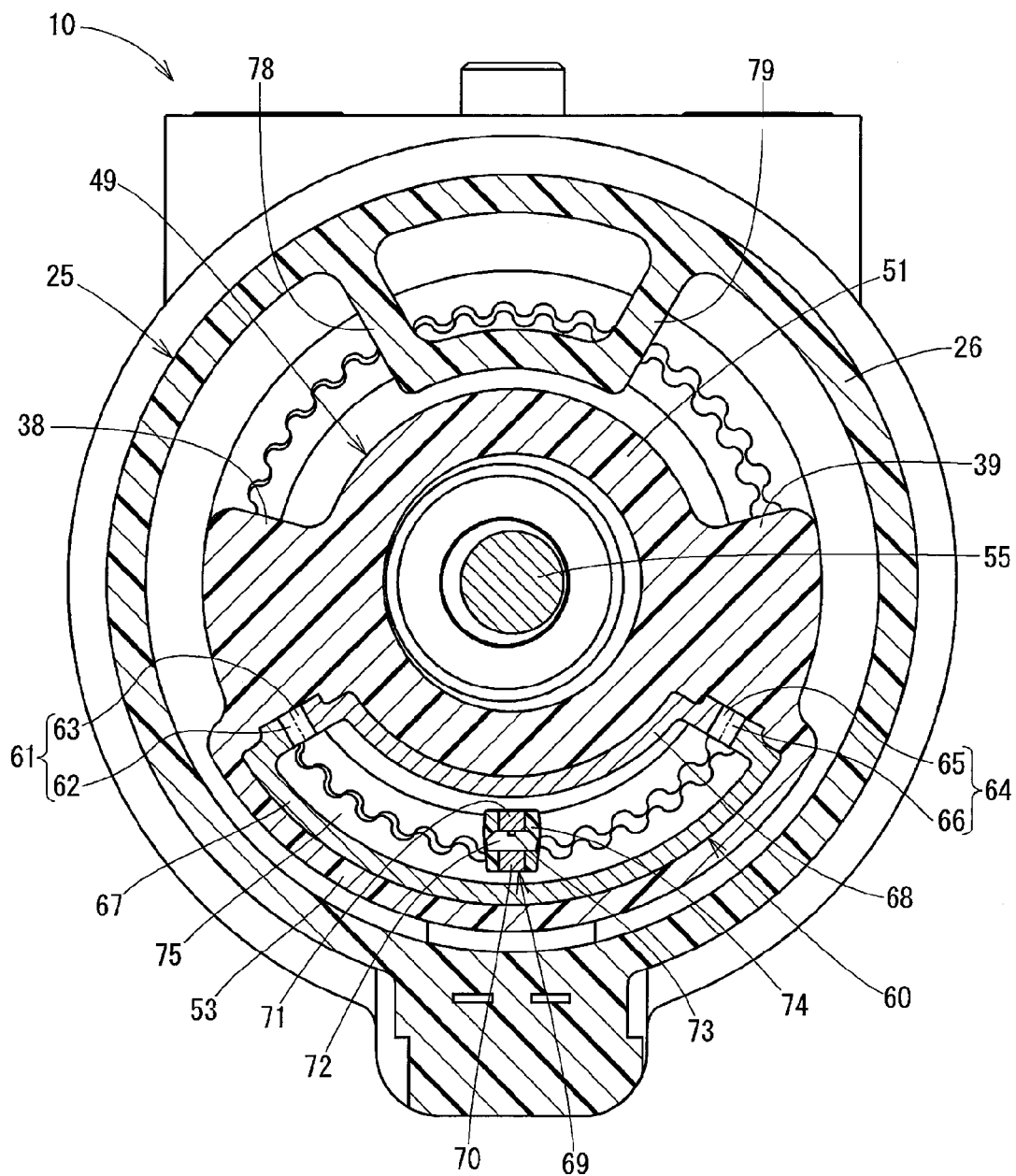
FIG. 9 is a sectional view taken along a line IX-IX of FIG. 3.

As shown in FIG. 9, the second-stage accommodation portion 26 of the casing 25 includes a fully closing stopper 78 and a fully opening stopper 79. The end reduction member 49 is capable of rotating with respect to the casing 25. The end reduction member 49 is capable of rotating from a position where an end part 38 of the protrusion portion 53 in the circumferential direction contacts the fully closing stopper 78 to a position where the other end part 39 of the protrusion portion 53 in the circumferential direction contacts the fully opening stopper 79. The rotational range of the end reduction member 49 with respect to the casing 25 is referred to as a "movable range". The position where the end reduction member 49 contacts the fully closing stopper 78 is referred to as an "Act fully closed position (AFCP)". The position where the end reduction member 49 contacts the fully opening stopper 79 is referred to as an "Act fully open position (AFOP)".

When the motor shaft 31 rotates, the first planetary gear 43 revolves around a center axis A1 of the motor shaft 31 and rotates about a center axis A2 of the eccentric portion 37 of the connection shaft 35. A rotation rate of the first planetary gear 43 is one forty-second of a rotation rate of the motor shaft 31. The first reduction portion 41 reduces the rotation of the motor shaft 31 into one forty-second in rotation rate, and transmits the reduced rotation to the second reduction portion 45. When the second planetary gear 46 rotates about the center axis A2 and revolves around the center axis A1 together with the first planetary gear 43, the end reduction member 49 rotates about the center axis A1. A rotation rate of the end reduction member 49 is one twenty-fifth of a rotation rate of the first planetary gear 43. The second reduction member 45 reduces the rotation of the first planetary gear 43 into one twenty-fifth in rotation rate, and transmits the reduced rotation to the output shaft 55.

The output shaft 55 is concentric with the motor shaft 31. The output shaft 55 is rotatably supported by the second bearing 57 and the third bearing 58. The annular member 52 is fixed to the output shaft 55 by press-fitting, for example. The output shaft 55 rotates integrally with the end reduction member 49. An end part of the output shaft 55 extends to an exterior of the casing 25 and is connected to the first lever 88.

The rotation detector 60 is located at the same position as the end reduction member 49 in the axial direction and is located at a different position from the center axis A1 in the radial direction. The rotation detector 60 is capable of detecting a degree of rotation of the end reduction member 49. The rotation detector 60 includes a first magnet 61, a second magnet 64, a first yoke 67, a second yoke 68 and a short-circuit magnetic path portion 69. The first magnet 61 is provided in a first end part of the through hole 54 of the protrusion portion 53 of the end reduction member 49 in the circumferential direction. The first magnet 61 is magnetized in the radial direction. A north pole 62 is positioned on a radially outer side of the first magnet 61, and a south pole 63 is positioned on a radially inner side of the first magnet 61. The first magnet 61 may be used as an example of a magnetism generation portion that generates magnetism.

The second magnet 64 is provided in a second end part of the through hole 54 of the protrusion portion 53 of the end reduction member 49 in the circumferential direction opposite the first end part within the through hole 54. The second magnet 64 is magnetized in the radial direction. A north pole 65 is positioned on a radially inner side of the second magnet 64, and a south pole 66 is positioned on a radially outer side of the second magnet 64. The second magnet 64 may be used as an example of the magnetism generation portion. Therefore, the first magnet 61 is opposite from the second magnet 62 in polarity in the radial direction. The first yoke 67 extends in the circumferential direction along a radially outer side of the through hole 54 so as to connect the north pole 62 of the first magnet 61 and the south pole 66 of the second magnet 64. The second yoke 68 extends in the circumferential direction along a radially inner side of the through hole 54 so as to connect the south pole 63 of the first magnet 61 and the north pole 65 of the second magnet 64.

The first yoke 67 and the second yoke 68 are magnetic-circuit components and form a closed magnetic circuit together with the first magnet 61 and the second magnet 64. Magnetic flux from the north pole 62 of the first magnet 61 can be separated into circulation magnetic flux passing through the first yoke 67 to the second magnet 64, leakage magnetic flux passing through a clearance 75 from the first yoke 67 to the second yoke 68, and direct magnetic flux flowing into the south pole 63 through the clearance 75 without passing through the first yoke 67 and the second yoke 68. Magnetic flux from the north pole 65 of the second magnet 64 can be separated into circulation magnetic flux passing through the second yoke 68 to the first magnet 61, leakage magnetic flux passing through the clearance 75 from the second yoke 68 to the first yoke 67, and direct magnetic flux flowing into the south pole 66 through the clearance 75 without passing through the first yoke 67 and the second yoke 68.

The short-circuit magnetic path portion 69 includes subsidiary yokes 70 and 71 (magnetism collection yokes) and a hall IC 72. The subsidiary yokes 70 and 71 and the hall IC 72 are integrated by molding of a molding member 74 made of resin, and the subsidiary yokes 70 and 71 and the hall IC 72 are fixed to the casing 25. The subsidiary yokes 70 and 71 are arranged in the radial direction inside the closed magnetic circuit, i.e. between the first yoke 67 and the second yoke 68. As shown in FIG. 5, the hall IC 72 is provided between the subsidiary yokes 70 and 71 and is electrically connected to the electronic control unit 92 through a signal terminal 76. The hall IC 72 may be used as an example of a magnetic detector provided inside the closed magnetic circuit. The hall IC 72 includes a hall element 73 and non-shown various correction portions.

The subsidiary yokes 70 and 71 are capable of causing the above-described leakage magnetic flux to pass intensively through the hall element 73. A density of the leakage magnetic flux is changed due to change of relative positions of the end reduction member 49 and the short-circuit magnetic path portion 69. Thus, the change of the flux density is detected by the hall element 73 and the relative positions are detected. The hall element 73 may be used as an example of a magnetic-flux-density detection element that outputs a signal dependent on a density of magnetic flux passing through the magnetic-flux-density detection element. The hall element 73 outputs a signal dependent on a density of magnetic flux passing through its magneto-sensing portion.

Figure 10:
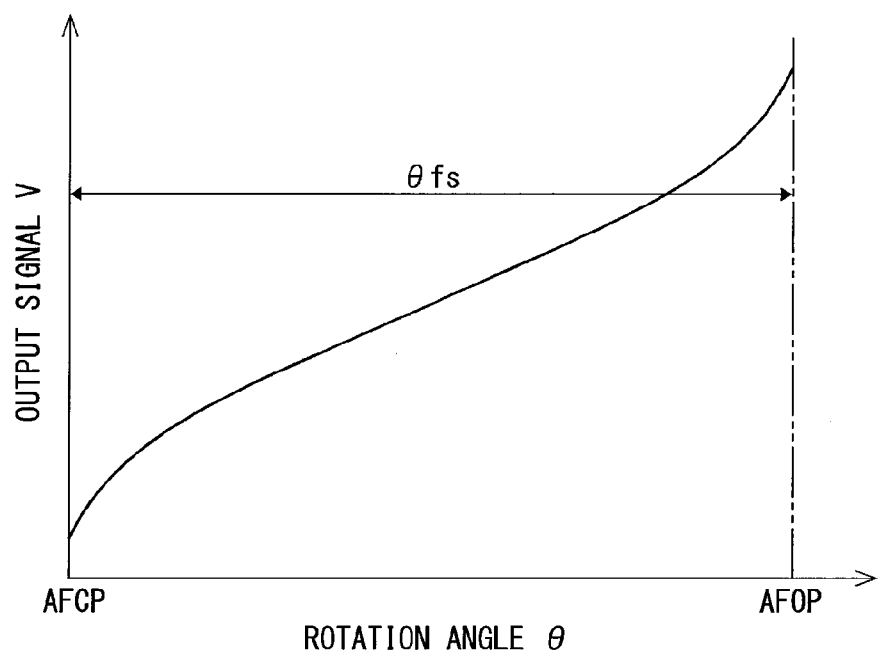
FIG. 10 is a diagram showing an output characteristic of a hall element of the rotation driving device according to the first embodiment and a second embodiment of the present disclosure.
Figure 11:
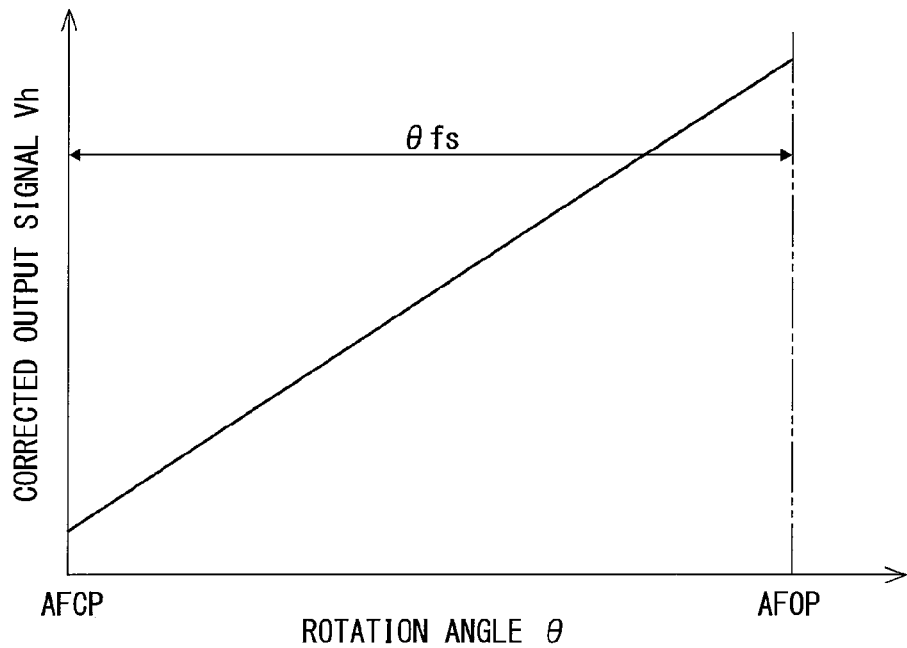
FIG. 11 is a diagram showing an output characteristic after multipoint correction by a multipoint correction portion of a hall IC of the rotation driving device according to the first embodiment.
Figure 12:
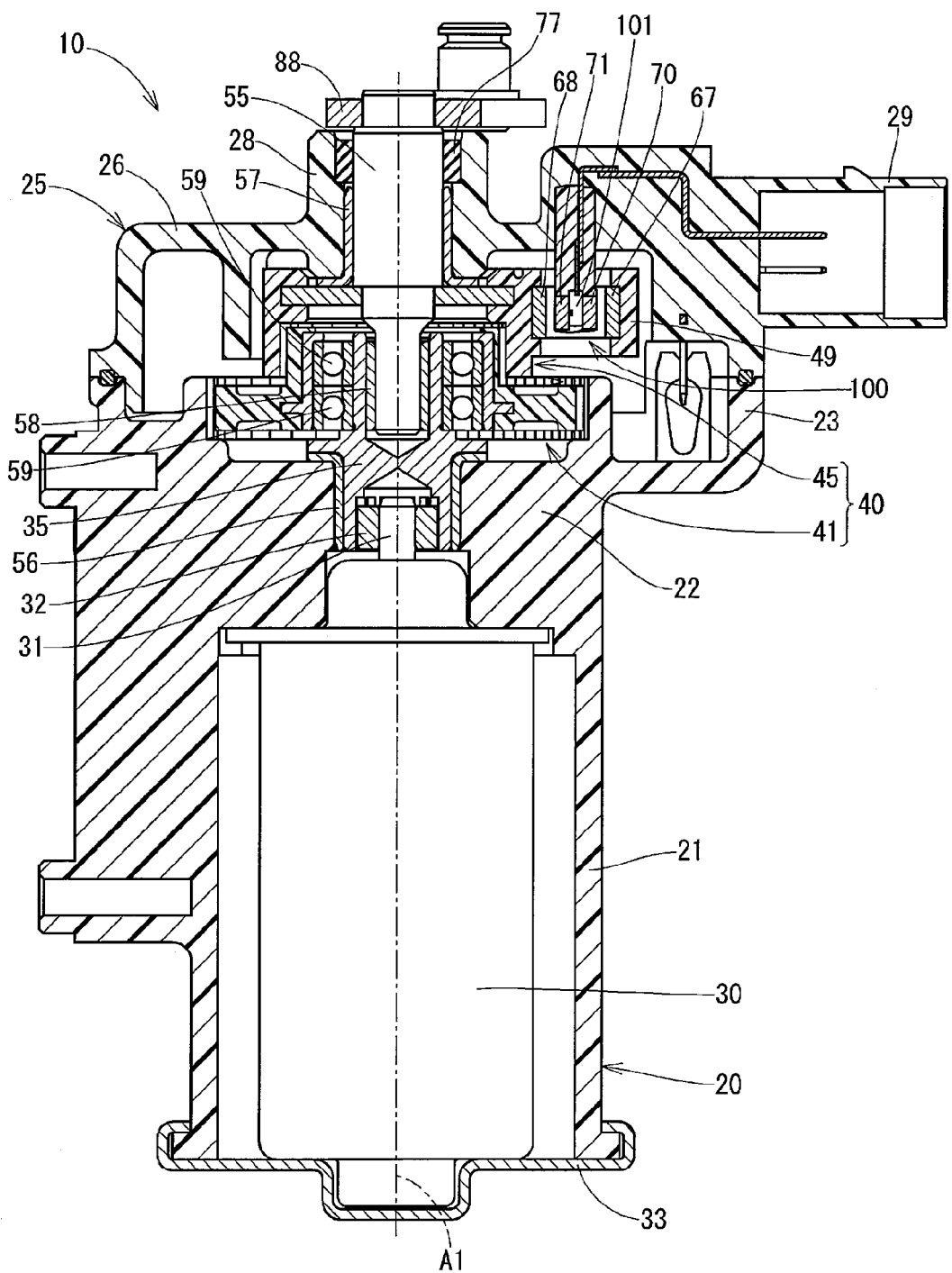
FIG. 12 is a sectional view showing a rotation driving device according to the second embodiment.

A relationship between an output signal V of the hall element 73 and a rotation angle θ of the end reduction member 49 is shown in FIG. 10 and is deflected from a linear relationship near the Act fully closed position (AFCP) and the Act fully open position (AFOP) because of the direct magnetic flux. The hall IC 72 is capable of correcting the output signal V of the hall element 73 within the movable range θfs into a corrected output signal Vh shown in FIG. 11. In other words, the hall IC 72 is capable of providing an output characteristic in which the output change of the hall IC 72 is linear with respect to the rotation angle θ of the end reduction member 49. Accordingly, calculation of the rotation angle θ based on the corrected output signal Vh can be performed easily.

When the electronic control unit 92 supplies power to the rotation driving device 10, the motor 30 makes the output shaft 55 rotate, and the rotation detector 60 outputs a signal to the electronic control unit 92. The signal outputted by the rotation detector 60 is dependent on the rotation angle of the end reduction member 49 relative to the casing 25. The electronic control unit 92 drives the motor 30 based on the output signal of the rotation detector 60, and performs feedback control such that the rotation angle of the end reduction member 49 becomes coincident with a target value.

As described above, the motor 30, the planetary gear reducer 40 and the output shaft 55 are provided coaxially with each other in the rotation driving device 10 of the present embodiment. Thus, the rotation driving device 10 can be made to be compact and smaller in its radial direction. This effect is prominent when compared with a comparative example using a parallel shaft gear reducer that includes multiple pairs of gears engaged with each other on their outer sides.

In the present embodiment, the rotation detector 60 is located at the same position as the end reduction member 49 in the axial direction, and is located at a different position from the center axis of the end reduction member 49 in the radial direction. Therefore, the rotation detector 60 can be provided within a space for the planetary gear reducer 40 in the axial direction in the rotation driving device 10. As a result, the size of the rotation driving device 10 in its axial direction can be made to be smaller and compact. This advantage is prominent when compared with a comparative example that requires a space for a rotation detector in the axial direction in addition to spaces for a motor, a reducer and an output shaft.

In the present embodiment, the rotation detector 60 detects a rotation angle of the end reduction member 49 connected directly to the output shaft 55. Hence, the rotation detector 60 is capable of directly detecting an abnormality of the output shaft 55. In the embodiment, the planetary gear reducer 40 has the hypocycloid gear mechanism. Thus, a relatively large reduction ratio can be obtained while an occupied volume of the planetary gear reducer 40 is relatively small. This advantage is prominent when compared with a comparative example using a parallel shaft gear reducer.

In the present embodiment, the second internal gear 50 of the planetary gear reducer 40 is smaller than the first planetary gear 43 in diameter. In other words, the second reduction portion 45 of the planetary gear reducer 40 is smaller than the first reduction portion 41. Thus, a vacant space can be provided on a radially outer side of the second internal gear 50, and the rotation detector 60 can be provided in the vacant space. Therefore, the rotation driving device 10 can be made to be smaller and compact in the radial direction.

In the present embodiment, the internal gear 42 and the housing 20 are parts of the same member. Thus, a fixing member for fixing the first internal gear 42 to the housing 20 is unnecessary. The number of components of the rotation driving device 10 can be reduced, and assembly of the rotation driving device 10 can be facilitated.

In the present embodiment, the first planetary gear 43 and the second planetary gear 46 are provided by molding of the resin gear portion 48 integrally with the metallic cylindrical portion 47. The gear portion 48 is made of a fluorine-resin contained material. Thus, lubrication of engaged portions of gears of the planetary gear reducer 40 can be improved only by making the gear portion 48 of a fluorine-resin contained material. In other words, there is no need to lubricate multiple members of the planetary gear reducer 40.

In the present embodiment, the rotation detector 60 is a non-contact sensor. The hall IC 72 that is a detection portion does not contact the end reduction member 49 that is a detected object. The hall IC 72 is provided inside the closed magnetic circuit. Therefore, the rotation detector 60 is difficult to be affected by a disturbance magnetic field, and thus, linearity of the output signal of the rotation detector 60 is high.

When the wastegate valve 85 is actuated in an opening or closing direction, an actuating force acting on the wastegate valve 85 needs to be larger than an average of pulsation force that acts on the wastegate valve 85 due to exhaust-gas pulsation. When the wastegate valve 85 is fully closed, the actuating force needs to be larger than a peak value of the pulsation force. When the actuating force is lower than or equal to the peak value, a gas leakage from the wastegate valve 85 may occur, and a supercharging ratio may decrease.

In the planetary gear reducer 40 of the present embodiment, a speed is reduced when rotation is transmitted from the motor 30 to the output shaft 55. When an efficiency of transmission of work from the motor 30 to the output shaft 55 is defined as a positive efficiency, and when an efficiency of transmission of work from the output shaft 55 to the motor 30 is defined as a negative efficiency, the negative efficiency is smaller than the positive efficiency. Thus, in the present embodiment, a necessary torque outputted from the rotation driving device 10 when the wastegate valve 85 is fully closed, i.e. a necessary torque to keep the wastegate valve 85 fully closed can be kept smaller than that of a comparative example using a parallel shaft gear mechanism in which the positive efficiency is the same as the negative efficiency. Therefore, in the present embodiment, a power consumed when the wastegate valve 85 is fully closed can be reduced. In other words, when the rotation driving device 10 is designed such that the consumed power for keeping the wastegate valve 85 fully closed becomes the same as that of the comparative example using the parallel shaft gear mechanism, the size of reducer can be made to be smaller than that of the comparative example.

In the present embodiment, the link mechanism 87 reduces rotation speed of the output shaft 55 of the rotation driving device 10 and transmits the rotation to the wastegate valve 85. The reduction ratio of the link mechanism 87 is set such that the total reduction ratio obtained by multiplying the reduction ratio of the link mechanism 87 by the reduction ratio of the planetary gear reducer 40 becomes a predetermined value. By dividing a total speed reduction from the motor shaft 31 to the wastegate valve 85 appropriately into a speed reduction of the link mechanism 87 and a speed reduction of the planetary gear reducer 40, the reduction ratio of the planetary gear reducer 40 can be made to be relatively small. As a result, the planetary gear reducer 40 can be made to be compact.

In the present embodiment, the first-stage accommodation portion 23 of the housing 20 and the second-stage accommodation portion 26 of the casing 25 are bonded by the secondary welding. Therefore, a joining member, such as a bolt or a nut, or a sealing member, such as an O-ring, is unnecessary. Moreover, a resin filled between the first-stage accommodation portion 23 and the second-stage accommodation portion 26 in the secondary welding may be the same material as the housing 20 and the casing 25. Thus, bonding strength at boundary surfaces between the housing 20 and the filled resin and between the casing 25 and the filled resin can be enhanced.

In the present embodiment, the concentric portion 36 of the connection shaft 35 is splined to the pinion gear 32 fixed to the motor shaft 31. The concentric portion 36 is capable of transmitting rotation to the motor shaft 31 and is movable in the axial direction relative to the motor shaft 31. Therefore, a displacement of the planetary gear reducer 40 with respect to the motor shaft 31 can be absorbed by the connection portion between the motor shaft 31 and the concentric portion 36 of the connection shaft 35.

Second Embodiment

In a second embodiment of the present disclosure, a part substantially the same as a part of the first embodiment is assigned the same numeral, and an explanation of the part will be omitted. A rotation detector 100 of a rotation driving device 10 according to the second embodiment of the present disclosure will be described with reference to FIGS. 10 and 12 to 14. In the second embodiment, a hall IC 101 of the rotation detector 100 corrects an output signal V of a hall element 73 shown in FIG. 10 by using a multipoint correction portion so as to obtain a corrected output signal Vh shown in FIG. 14 in accordance with a flow characteristic of exhaust gas through a wastegate valve 85 shown in FIG. 13. As a result, the hall IC 101 is capable of providing an output characteristic in which an output change of the hall IC 101 is non-linear with respect to a rotation angle θ of an end reduction member 49. The hall IC may be used as an example of the magnetic detector.

Figure 13:
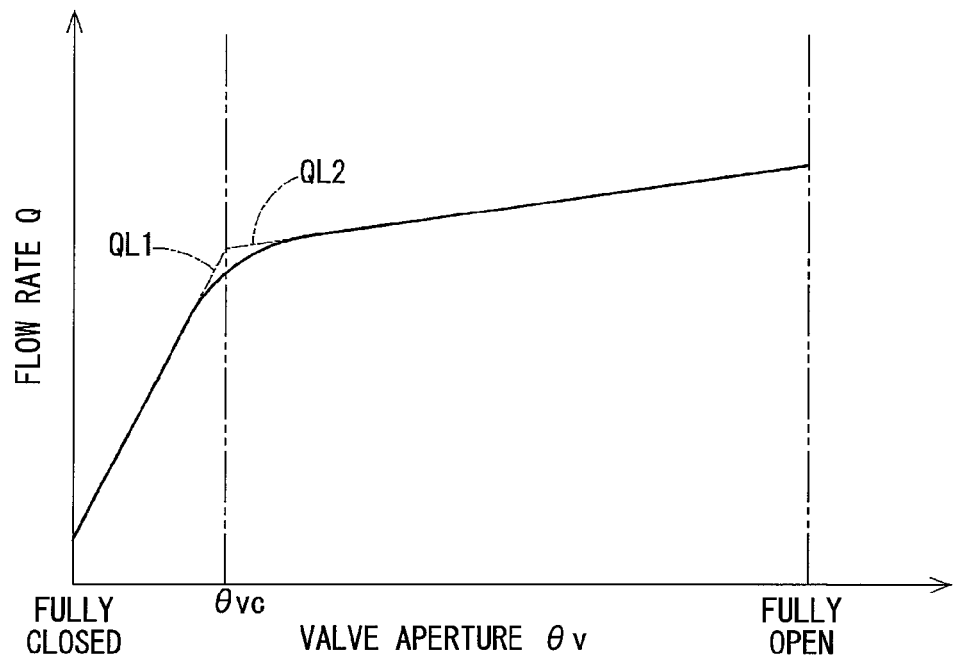
FIG. 13 is a diagram showing a flow characteristic of the wastegate valve device of FIG. 1.

In the flow characteristic of exhaust gas through the wastegate valve 85, as shown in FIG. 13, a flow rate Q drastically changes when a valve aperture θv of the wastegate valve 85 is relatively small, and the flow rate Q moderately changes when the valve aperture θv of the wastegate valve 85 is relatively large. In other words, the flow rate Q changes at a flow inflection point θvc. The flow rate Q is different between in a range (larger range) of the valve aperture θv larger than the flow inflection point θvc and in a range (smaller range) of the valve aperture θv smaller than the flow inflection point θvc. The flow inflection point θvc is an intersection point of a first approximate straight line QL1 in the smaller range of the valve aperture θv and a second approximate straight line QL2 in the larger range of the valve aperture θv. In accordance with the above-described flow characteristic, the multipoint correction portion of the hall IC 101 corrects the output signal V of the hall element 73. As shown by a characteristic straight line VL1 of FIG. 14, a change ratio of the corrected output signal Vh is relatively high in a range of rotation angle θ smaller than a specific rotation angle θc corresponding to the flow inflection point θvc of FIG. 13. As shown by a characteristic straight line VL2 of FIG. 14, the change ratio of the corrected output signal Vh is relatively low in a range of rotation angle θ larger than the specific rotation angle θc.

Figure 14:
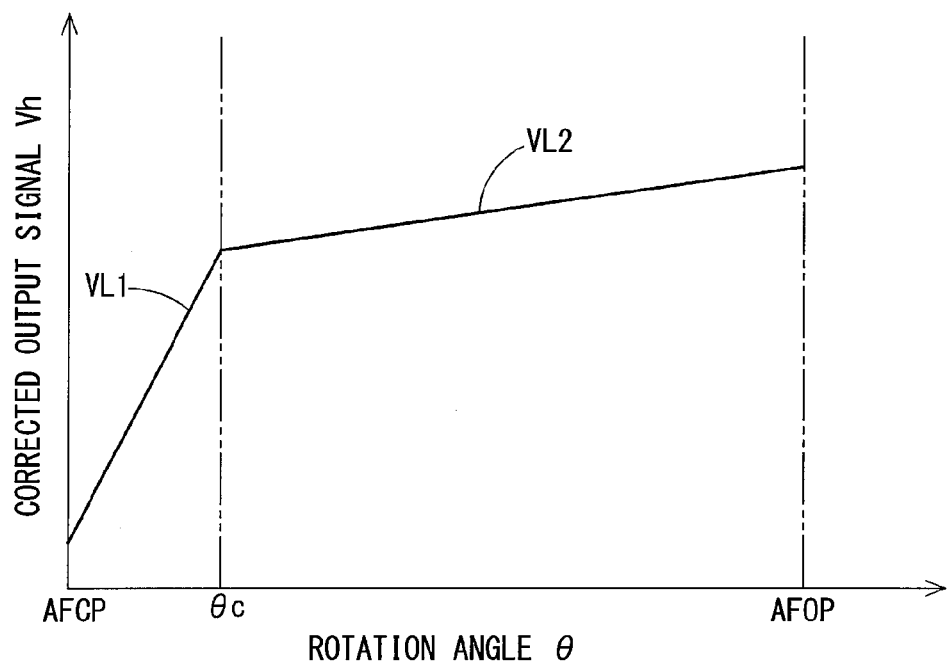
FIG. 14 is a diagram showing an output characteristic after multipoint correction by a multipoint correction portion of a hall IC of the rotation driving device according to the second embodiment.

According to the second embodiment, the hall IC 101 is capable of providing the output characteristic shown by the characteristic straight line VL1 in the range lower than the specific rotation angle θc and by the characteristic straight line VL2 in the range higher than the specific rotation angle θc, as shown in FIG. 14. Accordingly, when the change ratio of the flow rate Q is relatively high, in other words, when the valve aperture is relatively small, sensitivity of the corrected output signal Vh with respect to the rotation angle θ can be increased. Therefore, controllability of a supercharging pressure can be improved when the valve aperture is relatively small.

Although the present disclosure has been fully described in connection with the preferred embodiments thereof with reference to the accompanying drawings, it is to be noted that various changes and modifications will become apparent to those skilled in the art.

The number of the hall IC may be plural as necessary. The planetary gear reducer is not limited to the hypocycloid gear mechanism and may use another gear mechanism. The planetary gear reducer has the two reduction portions in the above embodiments, but may have more than three reduction portions. A difference in the number of gear teeth between the first reduction portion and the second reduction portion of the planetary gear reducer may be more than two. The method for bonding the housing and the casing is not limited to the secondary welding. For example, the housing and the casing may be bonded to each other by another method such as laser welding.

Instead of the link mechanism described above, another transmission mechanism may be used. A transmission mechanism capable of transmitting rotation of the output shaft of the rotation driving device to the wastegate valve may be used instead of the link mechanism. The link mechanism may be configured not to reduce speed. The motor shaft and the connection shaft are splined to each other. Alternatively, the motor shaft and the connection shaft may be connected to each other by Oldham's coupling, hook joint, or flexible fitting. The motor is not limited to the DC motor, and may be another type motor.

The wastegate valve device including the rotation driving device may be provided separately from the turbocharger. The rotation driving device is not limited to be used for the wastegate valve. For example, the rotation driving device may be used for a variable vane control device of a variable geometry turbocharger, a valve actuating device of an exhaust-gas throttle valve, a valve actuating device of an exhaust-gas switching valve, or a valve actuating device of a variable intake mechanism. The present disclosure is not limited to the above-described embodiments and is feasible in various embodiments without departing from the scope of the present disclosure.

Additional advantages and modifications will readily occur to those skilled in the art. The disclosure in its broader terms is therefore not limited to the specific details, representative apparatus, and illustrative examples shown and described.

What is claimed is:

1. A rotation driving device comprising:
a housing;
a motor provided in the housing;
a planetary gear reducer connected to the motor, the planetary gear reducer being coaxial with the motor;
an output shaft directly connected to an end reduction member of the planetary gear reducer, the output shaft being coaxial with the end reduction member; and
a rotation detector located at the same position as the end reduction member in an axial direction of the planetary gear reducer, the rotation detector overlapping the end reduction member in a circumferential direction of the planetary gear reducer, the rotation detector being located at a different position than a center axis of the end reduction member in a radial direction of the planetary gear reducer, the rotation detector being capable of detecting a rotation angle of the end reduction member, wherein
the motor generates a torque that is transmitted from the motor to the output shaft through the planetary gear reducer and the end reduction member in this order.

2. The rotation driving device according to claim 1, wherein the planetary gear reducer includes:
a first internal gear provided in the housing, the first internal gear being coaxial with the motor;
a first planetary gear being in contact with an inner side of the first internal gear, the first planetary gear being eccentric from the first internal gear;
a second planetary gear integrated with the first planetary gear, the second planetary gear being coaxial with the first planetary gear and smaller than the first planetary gear in outer diameter; and
the end reduction member eccentric from the second planetary gear and coaxial with the output shaft, the end reduction member forming a second internal gear, the second planetary gear being in contact with an inner side of the second internal gear.

3. The rotation driving device according to claim 2, wherein the second internal gear is smaller than the first planetary gear in outer diameter.

4. The rotation driving device according to claim 2, wherein the first internal gear and the housing are parts of a single member.

5. The rotation driving device according to claim 2, wherein the first planetary gear and the second planetary gear are parts of a single member made of fluorine resin or fluorine-resin contained material.

6. The rotation driving device according to claim 1, wherein the rotation detector includes:
a magnetism generation portion generating magnetism;
a yoke forming a closed magnetic circuit together with the magnetism generation portion; and
a magnetic detector provided in the closed magnetic circuit.

7. The rotation driving device according to claim 6, wherein the magnetic detector includes a magnetic-flux-density detection element that outputs a signal dependent on a density of magnetic flux passing through the magnetic-flux-density detection element.

8. The rotation driving device according to claim 7, wherein the rotation driving device is a driving source of a wastegate valve device.

9. The rotation driving device according to claim 8, wherein
in a case where the rotation angle of the end reduction member, which corresponds to a valve aperture of the wastegate valve device at which a change rate in flow rate of exhaust gas passing through the wastegate valve device is changed, is defined as a specific rotation angle, and
the magnetic detector corrects the output signal of the magnetic-flux-density detection element such that an output change with respect to a rotation angle of the end reduction member in a range of the rotation angle smaller than the specific rotation angle becomes more drastic than an output change with respect to the rotation angle of the end reduction member in a range of the rotation angle larger than the specific rotation angle.

10. The rotation driving device according to claim 1, wherein
the end reduction member has a through hole in which the rotation detector is provided; and
the through hole extends through the end reduction member in the axial direction of the planetary gear reducer.

11. The rotation driving device according to claim 10, wherein
the end reduction member further includes an output-shaft connection portion connected to the output shaft, and a protrusion portion protruding from the output-shaft connection portion outward in a radial direction, and
the protrusion portion has an arc shape extending in the circumferential direction of the planetary gear reducer, the protrusion portion having the through hole.

12. The rotation driving device according to claim 10, wherein
the through hole extends in the circumferential direction of the planetary gear reducer.

13. The rotation driving device according to claim 10, wherein the rotation detector includes:
a magnetism generation portion generating magnetism;
a yoke forming a closed magnetic circuit together with the magnetism generation portion, the closed magnetic circuit surrounding the through hole; and
a magnetic detector provided in the closed magnetic circuit, the magnetic detector being separated from the magnetism generation portion and the yoke.

* * * * *